United States Patent
Mechalke et al.

(10) Patent No.: US 7,568,122 B2
(45) Date of Patent: Jul. 28, 2009

(54) METHOD AND APPARATUS FOR IDENTIFYING A FAULTY COMPONENT ON A MULTIPLE COMPONENT FIELD REPLACEABLE UNIT

(75) Inventors: Jim L. Mechalke, Weld, CO (US); Yuanru Frank Wang, Broomfield, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 548 days.

(21) Appl. No.: 11/082,373

(22) Filed: Mar. 16, 2005

(65) Prior Publication Data

US 2006/0212752 A1 Sep. 21, 2006

(51) Int. Cl.
  *G06F 11/00* (2006.01)
(52) U.S. Cl. .............. 714/5; 714/46; 714/47; 714/48
(58) Field of Classification Search ............ 714/5, 714/46, 47, 48
See application file for complete search history.

(56) References Cited

U.S. PATENT DOCUMENTS

| | | | |
|---|---|---|---|
| 5,271,012 A | 12/1993 | Blaum et al. | |
| 5,333,143 A | 7/1994 | Blaum et al. | |
| 5,351,246 A | 9/1994 | Blaum et al. | |
| 5,412,809 A | 5/1995 | Tam et al. | |
| 5,579,475 A | 11/1996 | Blaum et al. | |
| 5,774,292 A | 6/1998 | Georgiou et al. | |
| 5,956,665 A * | 9/1999 | Martinez et al. | 702/188 |
| 6,122,756 A * | 9/2000 | Baxter et al. | 714/30 |
| 6,892,159 B2 * | 5/2005 | Weiss et al. | 702/130 |
| 7,131,030 B2 * | 10/2006 | Gilstrap et al. | 714/25 |
| 2002/0019870 A1 * | 2/2002 | Chirashnya et al. | 709/224 |
| 2002/0062195 A1 | 5/2002 | Shingo | |
| 2002/0099873 A1 * | 7/2002 | Hileman et al. | 710/1 |
| 2003/0046470 A1 | 3/2003 | Sivertsen | |
| 2003/0081378 A1 | 5/2003 | Debbins et al. | |
| 2004/0078634 A1 * | 4/2004 | Gilstrap et al. | 714/5 |
| 2004/0221198 A1 * | 11/2004 | Vecoven | 714/25 |
| 2005/0044169 A1 * | 2/2005 | Arbeitman et al. | 709/217 |
| 2006/0123289 A1 * | 6/2006 | Williams | 714/724 |

OTHER PUBLICATIONS

Sheppard, E., "Measuring the HBA's Role in SAN Management: An IDC White Paper," pp. 1-10 (2001).

Xyratex—Storage Systems—Storage Products, 4 pages, printed Feb. 4, 2005, available at http://www.xyratex.com/products/storage/storage_products.htm.

(Continued)

*Primary Examiner*—Robert Beausoliel
*Assistant Examiner*—Charles Ehne
(74) *Attorney, Agent, or Firm*—Thomas J. Lavan (57) ABSTRACT

The present invention is directed to a data storage system utilizing a number of data storage devices. The data storage system features one or more storage device sleds, which may each carry multiple storage devices. Each storage device sled and its interconnected storage devices may comprise a field replaceable unit. In response to the detection of a failure associated with a field replaceable unit, information related to that failure may be stored in memory or storage associated with the field replaceable unit. Repair personnel may access the stored information in order to positively identify the failed component of the field replaceable unit in connection with the repair or replacement of that component, in order to return the field replaceable unit to service.

25 Claims, 6 Drawing Sheets

OTHER PUBLICATIONS

Cook, R., New FC-AL technology ushers in "SBOD," 3 pages, (Dec. 15, 2003) printed Feb. 4, 2005, available at http://searchstorage.techtarget.com/tip/1,289483,sid5_gci940923,00.html.

Dot Hill, SANnet II FC Fibre Channel SAN Solution, 2 pages, printed Jan. 4, 2005, available at http://www.dothill.com/products/sannet2_fc/htm.

Emulex Corporation—Newsroom, 3 pages, (2005) printed Feb. 4, 2005, available at http://www.emulex.com/products/white/fc/art_storage.html.

nStor Corporation, 1 page (2004), printed Jan. 4, 2005, available at http://ww.nstor.com/default.asp?bdy=/product/Storage.asp.

International Search Report for International (PCT) Patent Application No. PCT/US 06/01035, mailed Aug. 29, 2007, p. 1-3.

International Written Opinion for International (PCT) Patent Application No. PCT/US 06/01035, mailed Aug. 29, 2007, p. 1-6.

The International Bureau of WIPO, "International Preliminary Report on Patentability" corresponding to PCT International application No. PCT/US2006/001035, Oct. 4, 2007, pp. 1-7.

* cited by examiner

METHOD AND APPARATUS FOR IDENTIFYING A FAULTY COMPONENT ON A MULTIPLE COMPONENT FIELD REPLACEABLE UNIT

FIELD OF THE INVENTION

The present invention is directed to providing data storage. In particular, the present invention is directed to providing identifying information regarding a faulty component in a multiple component field replaceable unit.

BACKGROUND OF THE INVENTION

The need to store digital files, documents, pictures, images and other data continues to increase rapidly. As a result, the demand for data storage continues to increase. In addition, recent legislation, such as the Sarbanes-Oxley Act in the United States, affecting the management of electronic records, has increased the need for data storage. As the demand for data storage has increased, the space or volume occupied by storage systems has become an important issue. In particular, data storage having high capacity, high density, and space efficiency has become increasingly desirable.

In order to provide increased storage space, storage devices with ever greater storage capacities are being developed. However, the storage needs of even small enterprises can easily exceed the storage capacity of a single data storage device. In addition, in order to safeguard data, systems providing data redundancy that include multiple storage devices are necessary.

Systems that provide at least some integration of individual storage devices, such as JBOD (just a bunch of disks), SBOD (switched bunch of disks) or RAID (redundant array of independent disks) systems have been developed. Such systems are typically deployed within enclosures to present an integrated component to the user. In order to facilitate serviceability and packaging, such systems may include sleds or carriers to which a number of storage devices are mounted. The sled may also provide interconnections to allow the attached storage devices to be operatively connected to a controller and/or a data bus. By providing storage devices attached to sleds, the removal and insertion of storage devices into a system enclosure can be facilitated. Accordingly, each sled and its associated storage devices can comprise an individual field replaceable unit (FRU) within a data storage system.

When there is a storage device failure within the data storage system, the FRU is replaced and returned to the manufacturer for servicing. Where there are a number of storage devices included in an FRU that have been removed due to a failure, all of the storage devices are usually treated as faulty, even though there may be only one storage device that is in fact faulty. As a result, fully operational storage devices may be permanently removed from service. The percentage of waste that results from this practice can be calculated by the number of good drives on a sled divided by the number of bad drives. For example, if there are two drives on a sled, there is a 100% waste if only one drive on that sled is actually bad. As a further example, if there are four drives on a sled and one drive is bad, there is a 300% waste.

If all of the storage devices are not treated as defective, full failure analysis must be performed for each drive on the sled. This task can consume large amounts of manpower and other resources. Furthermore, even if a full analysis is conducted, it cannot guarantee that the faulty drive will actually be detected. For example, failures can be transient, related to the data storage system with which the data storage device was associated, and/or related to the particular environment in which the data storage system operates. As a result, the practice of discarding all drives on a sled in response to detecting a failure associated with one of the interconnected drives has continued.

SUMMARY OF THE INVENTION

The present invention is directed to solving these and other problems and disadvantages of the prior art. In accordance with embodiments of the present invention, a storage system that includes one or more field replaceable units (FRUs) that each comprise a storage device sled, and one or more storage devices is provided. Further embodiments of the present invention include memory interconnected to each sled for storing information related to a failed component, such as failed storage device within the FRU associated with the sled. In accordance with still other embodiments of the present invention, information related to the identity of a failed component within an FRU is stored in bulk data storage and/or memory associated with one or more storage devices included in the FRU.

In accordance with embodiments of the present invention, a method for identifying a failed component, such as a failed storage device, within an FRU is provided. The method includes detecting or receiving an indication of a fault related to a component included as part of an FRU. Identification information related to the failed component is collected, as is information related to the location of the component on its associated sled. Information related to the identity and the location of the FRU having the failed component within the storage system may also be collected. Such information is stored in a storage facility provided as part of the FRU. The storage facility may comprise memory provided as part of electronic circuitry incorporated into or associated with the sled of the FRU, memory included in control circuitry associated with one or more of the storage devices included in the FRU, and/or memory comprising the data storage of one or more of the storage devices included in the FRU.

In accordance with still other embodiments of the present invention, in response to a component failure, an administrator or operator is notified of the failure. The FRU including the failed component is then removed from the storage system. The removed FRU may include not only the failed component, but other components that have not failed. In addition, the information collected regarding the identity and location of the failed component on the sled of the FRU is maintained in memory or storage included in the FRU. The administrator or operator can then return the storage system to full operational capabilities by replacing the FRU having a failed component (i.e., by providing a replacement FRU).

In accordance with further embodiments of the present invention, an FRU including a failed component can be serviced. Servicing may include interrogating the FRU to obtain information identifying the failed component. Repairs can then be made with respect to the identified component, while any other components included in the FRU can be left alone. For example, a storage device identified as being the component that has failed can be replaced, while other storage devices attached to the sled can be reused. The repaired FRU can then be redeployed to the field as a spare field replaceable unit.

Other features and advantages of embodiments of the present invention will become more readily apparent from the following description, particularly when taken together with the accompanying drawings.

DETAILED DESCRIPTION

The present invention is directed to providing a storage system for instructions or data, hereinafter referred to as a data storage system, which includes one or more field replaceable units (FRUs). Each of the FRUs may comprise multiple physical storage devices interconnected to a common sled. In addition, each of the FRUs includes memory capable of maintaining information related to the identification of a failed storage device in response to the detection of a failure of a storage device included in that field replaceable unit (FRU). Furthermore, an FRU in accordance with embodiments of the present invention may be configured for easy removal and replacement to facilitate the maintenance of a data storage system.

Figure 1:
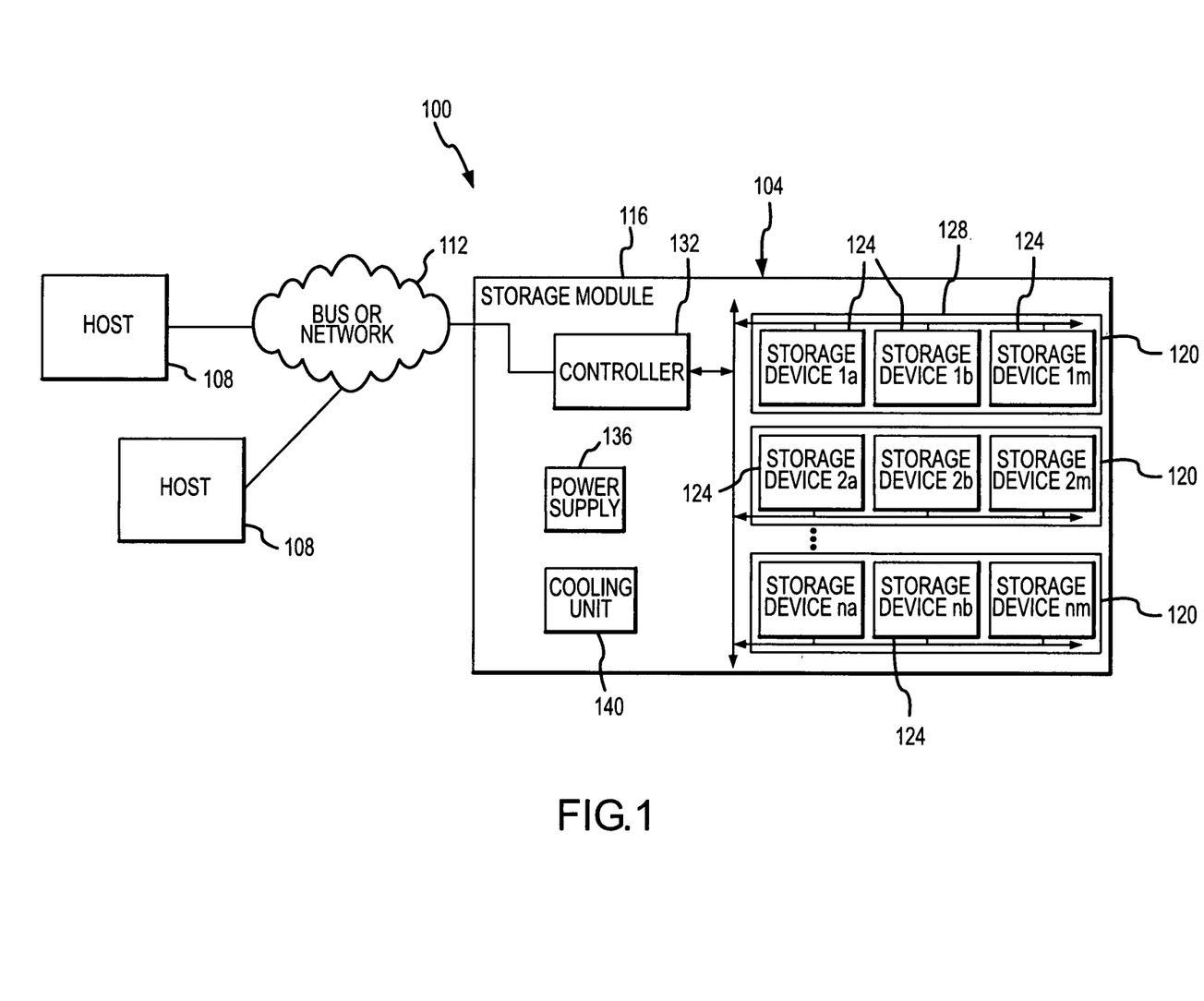
FIG. 1 is a block diagram depicting components of a data storage system in accordance with embodiments of the present invention.

With reference now to FIG. 1, a computer system 100 incorporating a data storage system 104 in accordance with embodiments of the present invention is illustrated. In general, the computer system 100 includes the data storage system 104 and one or more host processors or computers 108 interconnected to the data storage system 104 by a bus and/or network 112. Accordingly, embodiments of the present invention have applications in association with single or multiple hosts 108 and storage area network (SAN) or direct connect environments.

The data storage system 104 may include an enclosure or chassis 116 to interconnect and/or house at least some of the other components of the data storage system 104. In addition, the data storage system 104 may include a number of FRUs 120. Each FRU 120 includes one or more physical storage devices 124 interconnected to a storage device sled 128. The data storage system 104 may additionally include one or more controllers 132, one or more power supplies 136, and one or more cooling units 140.

Each FRU 120 provided as part of a data storage system 104 comprises a unit in which the one more storage devices 124 are interconnected to the sled 128. By interconnecting each storage device 124 of an FRU 120 to a common sled 128, replacement of one or more of the storage devices 124 of an FRU 120 can be effected by removing the entire FRU 120 from the enclosure or chassis 116 and data system 104, and inserting a replacement FRU 120 in the data storage system 104. Accordingly, embodiments of the present invention may include field replaceable units 120 that can be easily removed from and added to a data storage system 104.

The controller 132 performs functions to obtain and store information identifying a failed storage device in response to detection of such a failure. In particular, information collected may include information identifying a failed storage device 124, identifying the position of a failed storage device 124 on its associated sled 128, and identifying the sled 128 containing a failed storage device 124. Furthermore, the controller 132 stores at least some of the collected information related to the detected failure on the FRU 120 of which the storage device 124 is a part. Storing information on an FRU 120 related to a detected failure of a storage device 124 included in that FRU 120 can include storing such information in memory provided as part of or interconnected to the sled 128, as part of control electronics associated with one or more of the storage devices 124 associated with the FRU 120, or on the data storage media of one or more of the storage devices 124 included in the FRU 120.

The controller 132 may also function to control the flow of data between the bus or network 112 and storage devices 124 included in the data storage system 104. Accordingly, the controller 132 may comprise a controller or adapter that allows the multiple storage devices 124 to appear as a single storage device to a host 108. Therefore, a controller 132 may additionally comprise a RAID controller, implementing any one of various RAID schemes, a JBOD system controller, an SBOD system controller, or a controller for any other storage system featuring a number of storage devices 124. However, such system level control functions do not need to be performed by a controller 132 provided as part of a data storage system 104. For example, a controller that implements a RAID array using storage devices 124 provided as part of the data storage system 104 may be implemented as a separate controller, or as software provided as part of or running on a host 108 or other computer system, and may operate in cooperation with the controller 132 as part of the data storage system 104.

The one or more power supplies 136 may be included to provide power in the format required by the other components of the data storage system 104. For example, a power supply 136 may convert 120 Volt line power to a 12 Volt direct current for supply to the data storage devices 124, and a 3 Volt direct current for supply to the controller 132. Although a single power supply 136 is illustrated in FIG. 1, it can be appreciated that multiple power supplies 136 may be included in order to meet power requirements, or to provide redundancy.

The one or more cooling units 140 may be provided to help ensure that the nominal operating temperatures of storage devices 124 and other components associated with the data storage system 104 are not exceeded. In accordance with embodiments of the present invention, the cooling unit 140 comprises a fan or blower powered by an electric motor. Although shown as separate from the power supply 136, the cooling unit 140 may be integrated with the power supply 136. In addition, multiple cooling units 140 may be provided. A cooling unit 140 may also use various other cooling techniques, including systems that incorporate a liquid cooling medium.

Each storage device 124 may be separately addressable by at least a controller 132 provided as part of the data storage system 104. As an example, the storage device 124 may comprise a hard disk drive, such as a serial advanced technology attachment (SATA) disk drive. Accordingly, it can be appreciated that embodiments of the present invention may utilize relatively inexpensive storage devices 124. Examples of other storage devices 124 that may be used in connection with embodiments of the present invention include small computer systems interface (SCSI), serial attached SCSI (SAS) and fiber channel (FC) hard disk drives. Embodiments of the present invention may also utilize storage devices 124 other than devices utilizing magnetic disks as a storage medium. For example, a storage device 124 may also include magnetic tape devices, optical storage devices or solid state disk devices.

A storage device sled 128 generally provides a structure that permits two or more storage devices 124 to be interconnected to the storage device sled 128 forming at least part of an FRU 120. Furthermore, the structure provided by the storage device sled 128 facilitates the removal and replacement of storage device units 120 and their associated storage devices 124 by allowing all of the components of a storage device unit 120 to be removed from (or installed in) a data storage system 104. Accordingly, each FRU 120 may be replaced as a unit by personnel in the field.

In addition to providing a physical structure that permits the interconnection of one or more storage devices 124 to the sled 128, and to one another when multiple storage devices 124 are interconnected to the sled 128, a sled 128 may provide electrical signal and power channels. For example, a storage device sled 128 may include conductive traces for providing signal lines required by attached storage devices 124 and conductive traces for supplying power to those storage devices 124. The storage device sled 128 may additionally provide circuitry for performing various functions, such as implementing a controller 132 and/or for receiving additional components, such as a controller 132 integrated circuit or chip. In addition, the storage device sled 128 may incorporate memory or other storage space for information related to the identification of a failed storage device 124.

Figure 2:
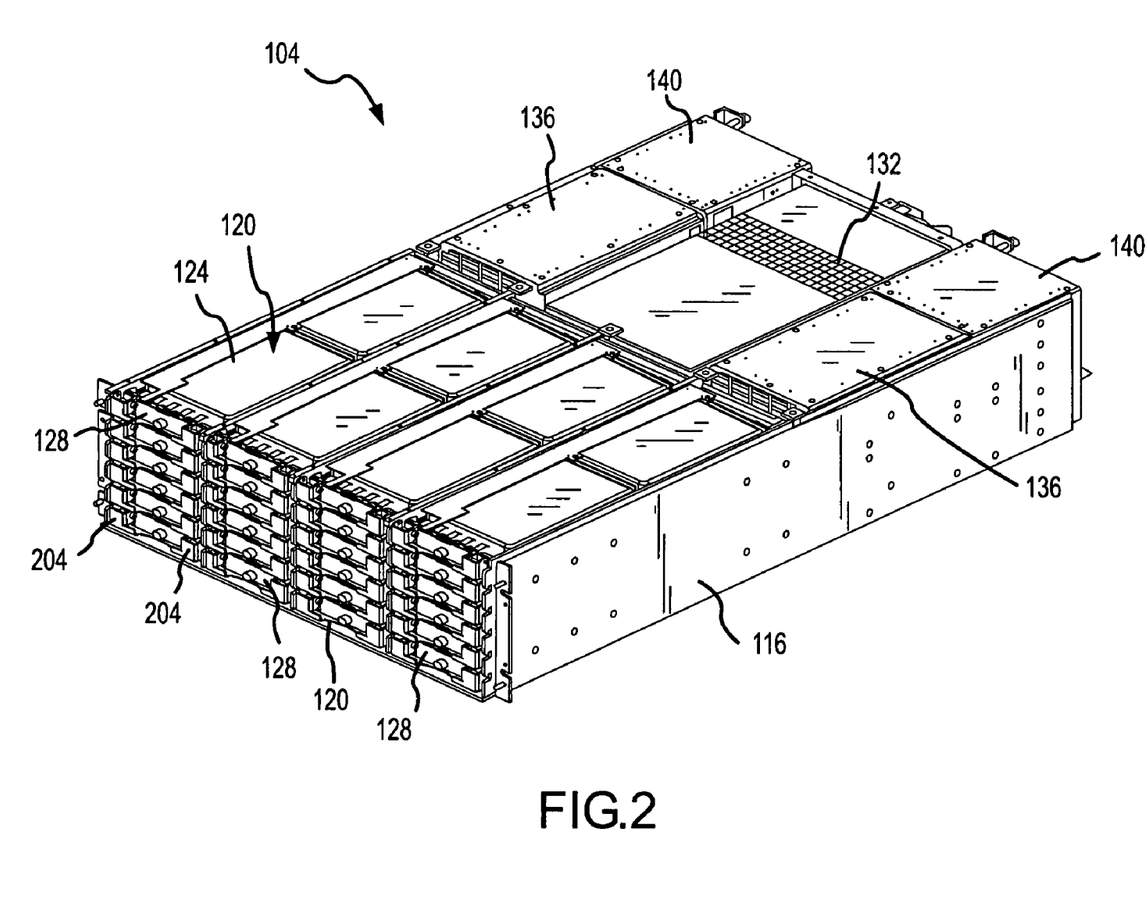
FIG. 2 is a perspective view of an exemplary data storage system in accordance with embodiments of the present invention.

With reference now to FIG. 2, a data storage system 104 in accordance with embodiments of the present invention is shown in a perspective view. In addition, the example data storage system 104 in FIG. 2 includes a chassis 116 comprising an enclosure, shown with the top and front covers removed. As shown, embodiments of the present invention can provide for densely packaged storage devices 124. In particular, where each storage device sled 128 has m storage devices 124 attached to it, and there are n storage device sleds 128, the total number of storage devices 124 in the data storage system 104 is n×m where n is the number of storage device sleds and m is the number of storage devices. In the example shown in FIG. 2, there are 24 storage device sleds 128 (i.e., n=24), and each storage device sled 128 has two interconnected storage devices 124 (i.e., m=2). Accordingly, the example data storage system 104 shown in FIG. 2 includes 48 storage devices 124 provided as part of 24 FRUs 120.

In accordance with embodiments of the present invention, each FRU 120 and its associated storage device sled 128 and storage devices 124 can be removed by releasing fasteners 204 and sliding the storage device sled 128 and attached storage devices 124 out of the enclosure 116. Furthermore, a failed FRU 120 can be replaced by inserting a spare FRU 120 in the slot within the enclosure 116 that had been occupied by the failed FRU 120. In accordance with still other embodiments of the present invention, a replacement FRU can be placed in any available slot in the enclosure 116.

Continuing the example shown in FIG. 2, power supplies 136 and cooling units 140 are mounted towards the rear of the enclosure 116. Furthermore, space between the power supplies 136 and cooling units 140 is provided for a controller 132 or other componentry.

Figure 3:
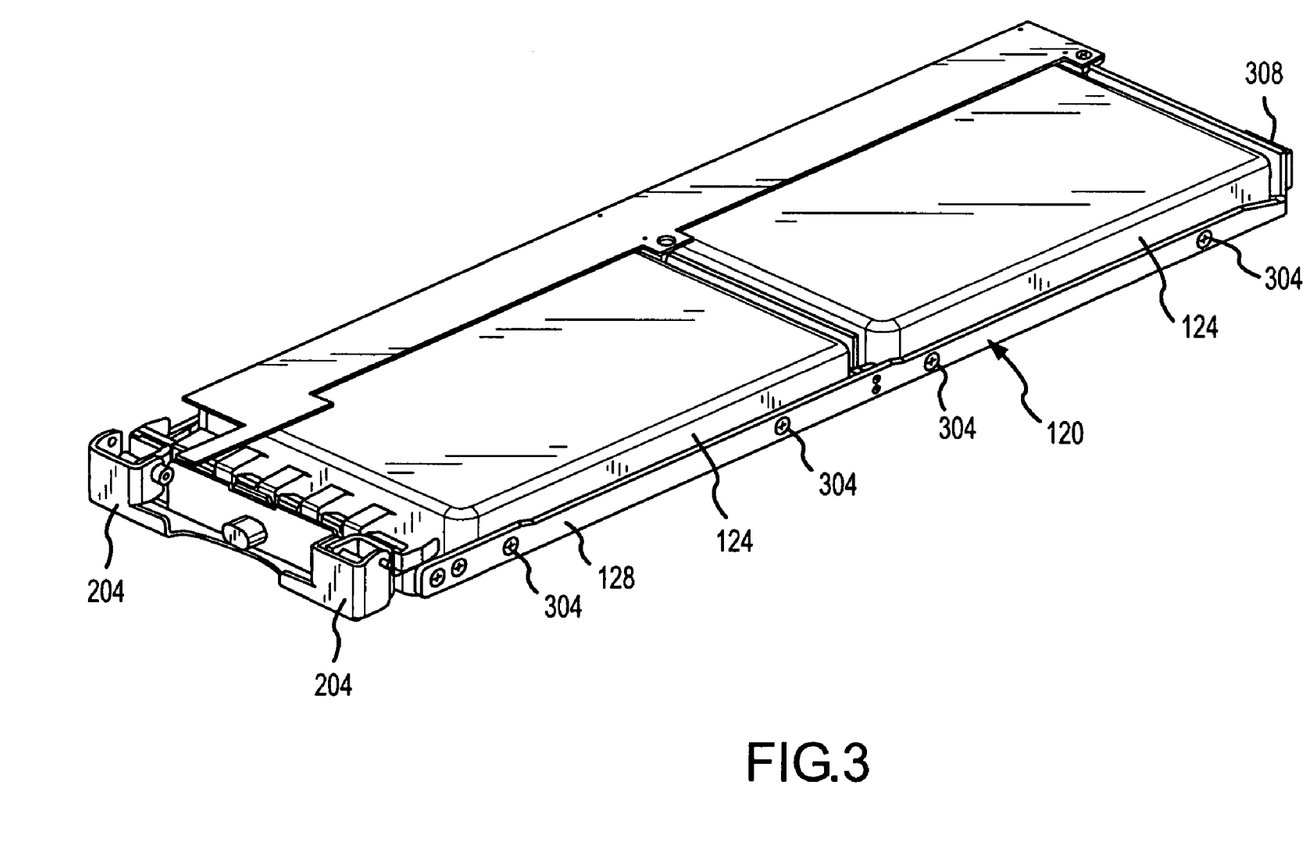
FIG. 3 is a perspective view of an exemplary field replaceable unit in accordance with embodiments of the present invention.

With reference now to FIG. 3, a single FRU 120 having two storage devices 124 is illustrated. As seen in FIG. 3, the storage devices 124 are interconnected to the storage device sled 128 by storage device fasteners 304. In addition, the embodiment illustrated in FIG. 3 incorporates fasteners 204 for securing the FRU 120 in an enclosure or to a chassis 116 that are incorporated into the storage device sled 128. The example FRU 120 of FIG. 3 also includes a power and signal interface 308 to connect the FRU 120 to the bus or network 112, for example through a mating connector and complementary signal lines provided as part of or within the enclosure 116, either directly or through a controller 132 or other components when the FRU 120 is operatively connected to the remainder of the data storage system 104.

Figure 4:
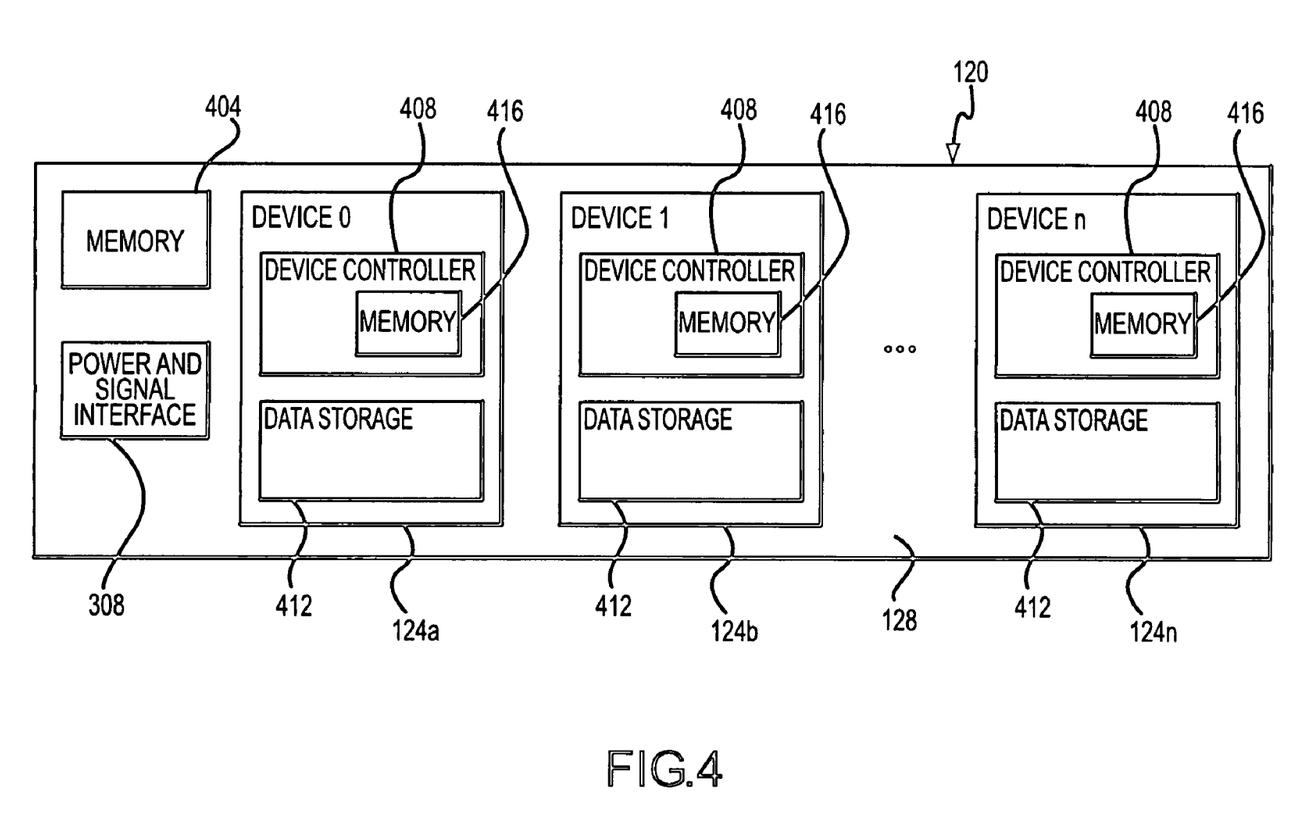
FIG. 4 is a block diagram depicting components of a field replaceable unit in accordance with embodiments of the present invention.

With reference now to FIG. 4, components of an FRU 120 in accordance with embodiments of the present invention are illustrated. In general, the FRU 120 may include a number of storage devices 124. Although three storage devices 124a, 124b and 124n are illustrated in FIG. 4, it should be appreciated that an FRU 120 is not limited to any particular number of storage devices 124. Each storage device 124 is interconnected to a storage device sled 128. Accordingly, where multiple storage devices 124 are included in an FRU 120, each of the storage devices 124 is interconnected to one another through the storage device sled 128. In addition, the FRU 120 may include memory 404, which can be used for storing information related to the failure of a storage device 124 or other component of an FRU 120, as described herein. In accordance with embodiments of the present invention, the memory 404 may comprise a serial EEPROM or other nonvolatile memory. The FRU 120 may also include a power and signal interface 308. In accordance with embodiments of the present invention, the power and signal interface 308 may comprise a connector that operatively interconnects other components of the FRU 120, such as the storage devices 124 and memory 404, to the data storage system 104 controller 132 and/or the system bus or network 112 when the FRU 120 is interconnected to the data storage system 104.

Each storage device 124 may include a device controller 408 and data storage 412. The device controller 408 may generally control the operation of the storage device 124. In addition, the device controller 408 may include memory 416. The memory 416 can be used for storing information related to the failure of a storage device 124 or other component of an FRU 120, as described herein. As used herein, the data storage 412 may comprise the storage media used to store data and associated structures for writing data to or reading data from the storage media. For example, in connection with a storage device 124 comprising a hard disk drive, the data storage 412 generally includes storage media in the form of magnetic disks, and a structure for writing data to and reading data from the storage media comprising one or more head disk assemblies comprising movable actuator arms and associated read/write heads generally under the control of the device controller 408.

Figure 5:
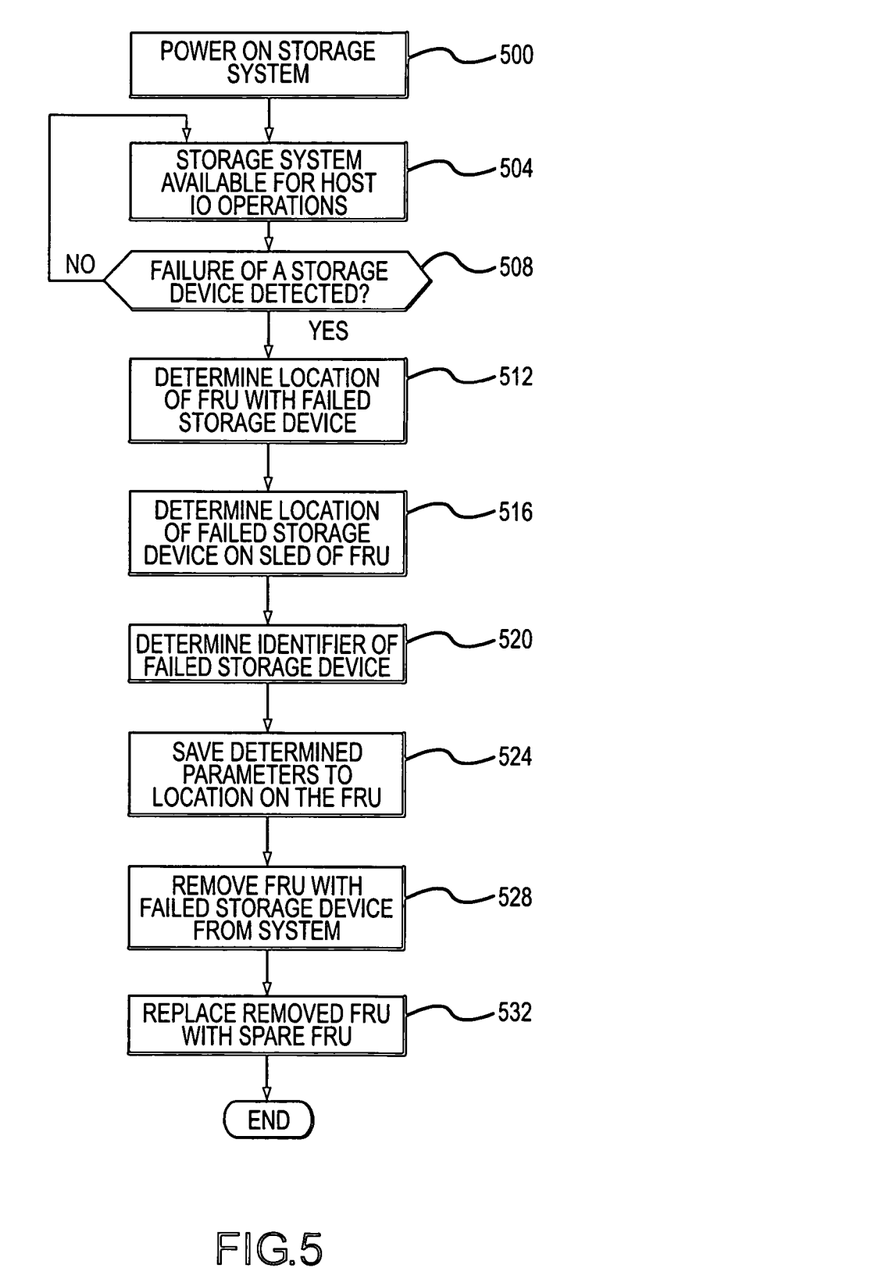
FIG. 5 is a flowchart illustrating aspects of the operation of a system in response to the detection of a storage device failure in accordance with embodiments of the present invention.

With reference now to FIG. 5, aspects of the operation of a data storage system 104 in accordance with embodiments of the present invention in response to the detection of a storage device 124 failure are illustrated. Initially, the storage system 104 is powered on (step 500). The data storage system 104 is then available for host input/output (IO) operations (step 504). At step 508, a determination is made as to whether a failure of a storage device 124 included in the data storage system 104 has been detected. If no failure has been detected, the process may return to step 504, and the data storage system 104 remains available for host IO operations.

If a failure of a storage device 124 is detected, the location of the FRU 120 with the failed storage device 124 within the data storage system 104 is determined (step 512). An identifier associated with the FRU having a failed storage device may also be determined. In addition, the location of the failed storage device 124 on the sled 128 of the FRU 120 is determined (step 516). At step 520, the identifier of the failed storage device 124 is determined. The determined parameters may then be saved to a location on the FRU 120 in which the failed storage device 124 is included (step 524). Saving the determined parameters to a location on the FRU 120 can include storing that information in memory 404 provided generally with respect to the FRU 120, on memory 416 included in or provided as part of one or more of the storage devices 124, or in memory comprising the data storage 412 provided as part of one or more of the storage devices 124. As can be appreciated by one of skill in the art from the description provided herein, where parameters regarding a failed storage device 124 are stored in memory 416 and/or data storage 412 associated with a storage device 124, such parameters may be stored in memory 416 or data storage 412 associated with a storage device 124 that is not determined to have failed.

At step 528, the FRU 120 with the failed storage device 124 is removed from the data storage system 104. In order to return the data storage system 104 to its original operating status, the removed FRU 120 can be replaced by a spare FRU 120 (step 532). For example, a spare FRU 120 can be interconnected to the data storage system 104 by placing it in the slot of the enclosure 116 that had been occupied by the FRU 120 on which a data storage device 124 failed.

As can be appreciated by one of skill in the art after consideration of the description provided herein, various steps described in connection with FIG. 5 need not be performed in the order presented. For instance, steps 516 through 524 can be reordered. In addition, although the example given in FIG. 5 relates to a failure associated with a storage device 124, embodiments of the present invention are not so limited. For example, a failure associated with another component of an FRU 120 can be detected, and information related to such failure can be stored on the FRU 120, prior to removal of the FRU 120 from the data storage system 104. Furthermore, it should be appreciated that all of the described parameters need not be determined and stored. However, at least a parameter or parameters identifying a failed storage device 124 (or other failed component of the FRU 120) should be stored somewhere on the FRU. Also, it should be appreciated that other parameters may be determined and stored if desired.

The determination of failure parameters such as described in connection with FIG. 6 may be performed in connection with the execution of instructions by the data storage device 104 controller 132. Furthermore, the storage of determined failure parameters on an FRU 120 associated with a detected failure can be performed by the controller 132. As can be appreciated by one of skill in the art after consideration of the disclosure provided herein, by storing failure parameters or information on a field replaceable unit 120 associated with a detected failure, errors that might otherwise be caused by a disassociation of such information with the affected FRU 120 can be avoided. Furthermore, administration of repair procedures can be facilitated by removing the need to associate separately maintained failure information with an FRU 120 having a failed component in order to retrieve information identifying the failed component.

Figure 6:
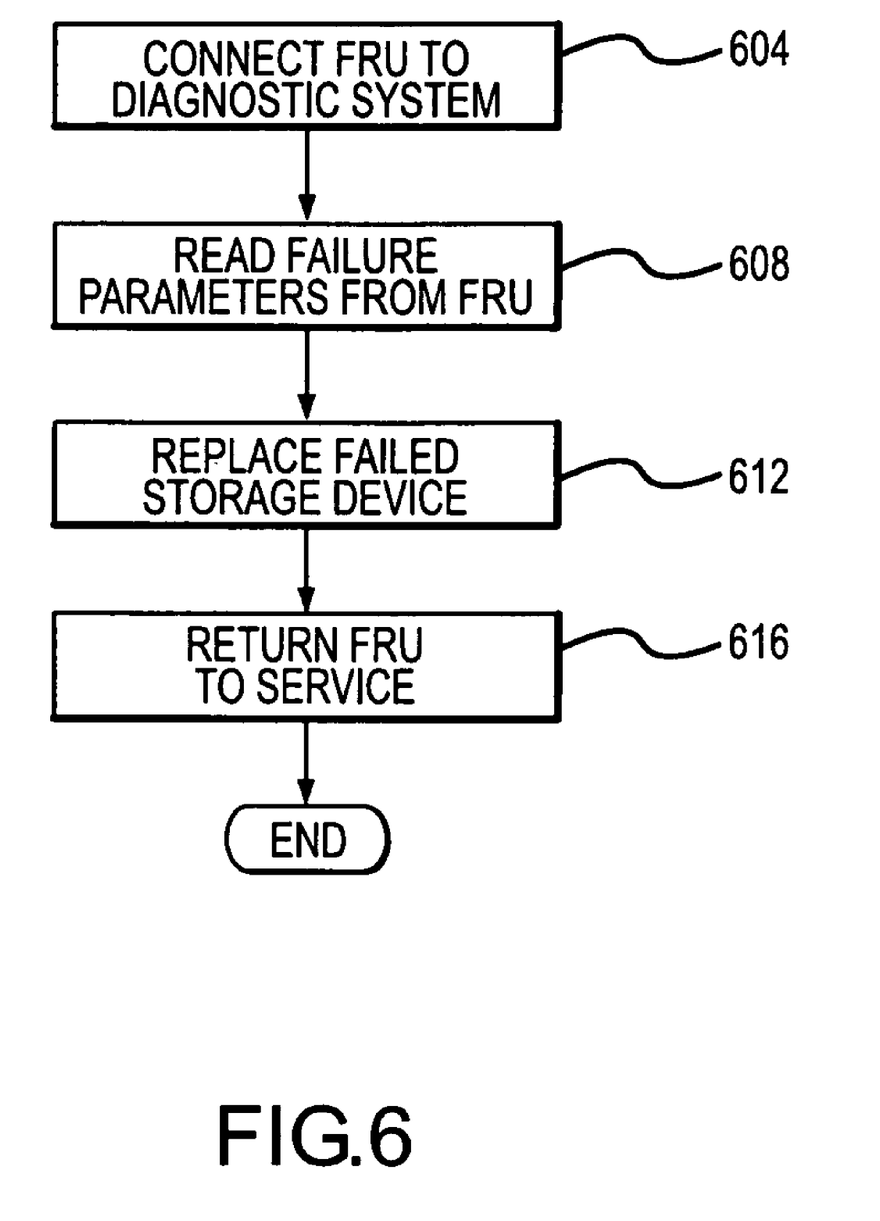
FIG. 6 is a flowchart illustrating aspects of a storage system repair operation in accordance with embodiments of the present invention.

With reference now to FIG. 6, aspects of a storage system repair operation in accordance with embodiments of the present invention are illustrated. In general, the process illustrated in FIG. 6 may be performed after an FRU 120 having a failed storage device 124 or that is otherwise associated with a failure has been removed from a data storage system 104. Furthermore, the process illustrated in connection with FIG. 6 is representative of steps that may be taken at or by a repair facility.

Initially, the FRU 120 associated with a failure is connected to a diagnostic system (step 604). As can be appreciated by one of skill in the art after appreciation of the description provided herein, a diagnostic system may comprise a general purpose computer or a test board capable of being interconnected to an FRU 120 and of retrieving the parameters that were stored on the FRU 120 pertaining to a detected failure. After connecting the FRU 120 a diagnostic system, the failure parameters are read from the FRU 120 (step 608). In general, where a storage device 124 has experienced a failure, the parameters stored on the FRU 120 identify the failed storage device 124 by its location on the sled 128 of the FRU 120, and may also include a storage device 124 identifier. Accordingly, by reading the stored parameters from the FRU 120, service personnel can be apprised of the storage device 124 requiring replacement. Furthermore, where the identifier of the storage device 124 that has failed is stored, the storage device 124 at the indicated position can be inspected or queried for its identifier, to confirm the identity of the storage device 124 before it is removed from the FRU 120. In accordance with embodiments of the present invention in which an identifier associated with the FRU 120 is stored, the stored identifier can be compared to an identifier embedded in the FRU 120 to confirm that the failure parameters pertain to the FRU 120 being serviced. The storage device 124 identified as the failed storage device 124 is then replaced with a fully operational storage device 124 (step 612). After replacement of the failed storage device 124, the FRU 120 can be returned to service, for example as a spare FRU 120 (step 616). Returning an FRU 120 to service can include erasing and/or reformatting included data storage devices 124.

Although various examples provided herein have discussed the failure of a storage device 124, it should be appreciated that embodiments of the present invention are not so limited. For example, parameters associated with the failure of other components included in an FRU 120 can be determined and stored on that FRU 120.

In accordance with embodiments of the present invention, an algorithm may be used to identify a storage device 124 associated with a fault. In accordance with an exemplary one of such embodiments, each storage device 124 in a data storage system 104 may be numbered sequentially with a device ID and may be zero based (i.e., the first storage device 124 on the first sled 128 is assigned the number 0 as a device ID). The location of a faulty storage device 124 can be determined by the formula: D modulus of N, where D is the sequentially assigned device ID, and where N is the number of storage devices 124 interconnected to each sled 128.

The location of a sled 128 included as part of the FRU 120 having the faulty storage device 124 is also determined. In particular, each sled 128 has an identifier, which is assigned sequentially and is based on the physical location of the sled 128 within the data storage system 104 enclosure 116. The location of a sled 128, which corresponds to the location of an FRU comprising that sled 128, can then be given by the following: (D−S)/N+M, where S is the starting drive identifier and where M is the number of missing sleds 128 below the sled 128 for which the location is being determined.

The sled location 128 and storage device 124 location on the sled 128 can then be stored in memory or data storage provided as part of the FRU 120 including the identified storage device 124 and sled 128. In addition, the storage device 124 identifier and/or serial number can be stored on the FRU 120. As can be appreciated by one of skill in the art, the example algorithms can be implemented using instructions executed by the controller 132. Furthermore, it should be appreciated that the example algorithms should be performed using whole number operations rather than floating point operations.

Accordingly, it can be appreciated that embodiments of the present invention facilitate the maintenance of data storage systems 104 having a number of data storage devices 124, and in which multiple storage devices 124 are interconnected to common sleds 128. More particularly, embodiments of the present invention permit an administrator or operator of a data storage system 104 to remove an FRU 120 having a number of attached storage devices 124, including at least one failed storage device 124, as a single unit. The administrator or operator may further return a data storage system 104 to full operational capabilities by replacing a removed FRU 120 with a spare FRU 120. As can be appreciated by one of skill in the art, returning a data storage system 104 to full operational capability after removing an FRU 120 with a failed storage device 124 may comprise rebuilding data according to a redundant data storage scheme.

Embodiments of the present invention further operate to reduce waste and/or servicing costs by storing information identifying a failed storage device 124 in memory or data storage included in the FRU 120. As a result, information related to the failure of an FRU 120 component is not disassociated from the FRU 120, and therefore maintenance personnel can access such information from the FRU 120 itself. Accordingly, repair personnel can identify a failed device 124 positively, without requireing testing of the individual storage devices 124. In addition, information identifying a failed storage device 124 may be redundant, for example by identifying a storage device 124 by its position on a storage device sled 128 and by an associated identifier. Furthermore, by maintaining information identifying a failed storage device 124 as part of the FRU 120 that includes the failed storage device 124, the accuracy and speed with which a failed storage device 124 can be identified can be increased.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A storage system, comprising:
a first field replaceable unit, including:
a storage device sled;
at least a first storage device included in a plurality of storage devices interconnected to said storage device sled;
memory containing data, said data including data identifying a faulty storage device of said first field replaceable unit by at least a component identifier associated with said faulty storage device and a location within said field replaceable unit of said faulty storage device, wherein said faulty storage device comprises said at least a first storage device, wherein said memory containing data is located on or is integral to the first field replaceable unit, and wherein said data including a location within said field replaceable unit allows said faulty storage device to be distinguished from a second storage device included in said plurality of storage devices interconnected to said storage device sled included as part of said first field replaceable unit based on the location of said first storage device on said storage device sled included as part of said first field replaceable unit.

2. The storage system of claim 1, wherein said memory containing data comprises memory interconnected to said sled, and wherein said memory interconnected to said sled is not included in said at least a first storage device.

3. The storage system of claim 1, wherein said memory containing data comprises memory included in said at least a first storage device.

4. The storage system of claim 1, wherein said memory containing data comprises data storage provided as part of said at least a first storage device.

5. The storage system of claim 1, wherein said data identifying a faulty storage device of said first field replaceable unit identifies said at least a first storage device.

6. The storage system of claim 1, wherein said field replaceable unit includes a plurality of storage devices.

7. The storage system of claim 1, further comprising:
a controller, wherein in response to detection of said fault associated with a storage device of said first field replaceable unit, said controller causes said data identifying said at least a first storage device to be stored in said memory.

8. The storage system of claim 7, wherein said first field replaceable unit further includes a power and signal interface, and wherein in an operational mode said power and signal interface is interconnected to said controller.

9. The storage system of claim 1, further comprising:
a storage system chassis capable of interconnecting a number of field replaceable units, wherein in an operational mode said first field replaceable unit is interconnected to said storage system chassis.

10. The storage system of claim 9, wherein said first field replaceable unit comprises fasteners, wherein in said operational mode said fasteners secure said first field replaceable unit to said storage system chassis.

11. A method for identifying a faulty component in a data storage system, comprising:
detecting a faulty component included in a first field replaceable unit having a number of components, said components including at least a first storage device; and
storing information related to said detected faulty component in first memory included in said first field replaceable unit, wherein said stored information includes an identifier of said detected faulty component and a location within said first field replaceable unit of said detected faulty component, wherein said faulty component comprises a first storage device included in a plurality of storage devices interconnected to a storage device sled included as part of said first field replaceable unit, wherein said information related to said location of said detected faulty component comprises information indicating a location of said first storage device interconnected to said storage device sled included as a part of said first field replaceable unit, wherein said information including a location of said detected faulty component comprising a first storage device within said first field replaceable unit allows said first storage device to be distinguished from a second storage device included in said plurality of storage devices interconnected to said storage device sled included as part of said first field replaceable unit based on the location of said first storage device on said storage device sled included as part of said first field replaceable unit, and wherein said first memory is interconnected to said storage device sled.

12. The method of claim 11, wherein said detecting a faulty component is performed while said field replaceable unit is interconnected to said data storage system, said method further comprising:
removing said first field replaceable unit from said data storage system, wherein said information remains stored in said first memory included in said first field replaceable unit.

13. The method of claim 12, further comprising:
inserting a second field replaceable unit in said data storage system to replace said first field replaceable unit.

14. The method of claim 12, further comprising reading said stored information related to said detected faulty component from said first memory included in said first field replaceable unit after said first field replaceable unit has been removed from said data storage system.

15. The method of claim 14, further comprising replacing said detected faulty component based on said information related to said detected faulty component stored in said first memory included in said first field replaceable unit with a replacement component.

16. The method of claim 14, further comprising interconnecting said first field replaceable unit to a diagnostic system in order to read said stored information.

17. The method of claim 11, wherein said components of said first field replaceable unit include a plurality of storage devices, and wherein said first memory included in said first field replaceable unit in which said information related to said detected faulty component is stored is provided as a component that is separate from said number of storage devices.

18. The method of claim 11, wherein said components of said first field replaceable unit include a plurality of storage devices, and wherein said first memory included in said first field replaceable unit in which said information related to said detected faulty component is stored is provided as part of at least one of said storage devices.

19. The method of claim 11, wherein said components of said first field replaceable unit include a plurality of storage devices, and wherein said first memory included in said first field replaceable unit in which said information related to said detected faulty component is stored comprises storage media included in at least one of said storage devices.

20. A field replaceable unit, comprising:
a plurality of means for storing user data;
means for interconnecting said plurality of means for storing user data, wherein said plurality of means for storing user data are mounted to said means for interconnecting said plurality of means for storing user data;
means for storing information related to a fault associated with said field replaceable unit, wherein said means for storing information related to a fault associated with said field replaceable unit is mounted to said means for interconnecting said plurality of means for storing user data, wherein said fault is associated with a faulty component included as part of said field replaceable unit, wherein information including an identification and a location of said faulty component on said means for interconnecting said plurality of means for storing user data is stored in said means for storing information, wherein said faulty component comprises a first means for storing user data, and wherein information including a location of said faulty component on said means for interconnecting said plurality of means for storing user data permits said faulty component comprising a first means for storing user data to be distinguished from a second means for storing user data included in said plurality of means for storing user data.

21. The field replaceable unit of claim 20, wherein said means for storing information related to a fault associated with said field replaceable unit is provided separately from and in addition to said plurality of means for storing user data.

22. The field replaceable unit of claim 20, wherein said means for storing information related to a fault associated with said field replaceable unit comprises memory included in said plurality of means for storing user data.

23. The field replaceable unit of claim 20, wherein said means for storing information related to a fault associated with said field replaceable unit comprises data storage included in said plurality of means for storing user data.

24. The method of claim 11, wherein said first field replaceable unit further includes second memory that is different than said first memory, wherein an identifier of said first field replaceable unit is stored in said second memory, and wherein said stored information in said first memory further includes said identifier of said first field replaceable unit.

25. The method of claim 11, wherein said first memory is not part of said first storage device comprising a faulty component.

* * * * *